(12) United States Patent  
Cook et al.

(10) Patent No.: US 6,598,281 B2  
(45) Date of Patent: Jul. 29, 2003

(54) METHOD FOR MOUNTING A METAL BODY ON THE MEASURING TUBE OF A CORIOLIS MASS FLOWMETER

(75) Inventors: Vincent Cook, Northants (GB); Lawrence Davies, Nor Corby Northants (GB); Neil Harrison, Duston (GB); Yousif Hussain, Weston Favell (GB); Chris N. Rolph, Hartwell (GB)

(73) Assignee: Krohne A.G. (DE)

( * ) Notice: Subject to any disclaimer, the term of this patent is extended or adjusted under 35 U.S.C. 154(b) by 0 days.

(21) Appl. No.: 10/309,987

(22) Filed: Dec. 4, 2002

(65) Prior Publication Data

US 2003/0084559 A1 May 8, 2003

Related U.S. Application Data

(62) Division of application No. 09/632,661, filed on Aug. 4, 2000, now Pat. No. 6,519,828.

(30) Foreign Application Priority Data

Aug. 4, 1999 (DE) .......................................... 199 39 008

(51) Int. Cl.⁷ .................................................. B23P 11/02
(52) U.S. Cl. .............................. 29/447; 29/458; 29/508; 29/515; 73/861.355
(58) Field of Search ........................ 29/447, 458, 469, 29/508, 515, 516, 517, 888.1; 73/861.355, 861.356, 861.357; 228/135; 403/273, 274, 278, 281, 285; 285/382, 382.1, 382.2, 381.1

(56) References Cited

U.S. PATENT DOCUMENTS

| | | | | |
|---|---|---|---|---|
| 1,827,267 A | * | 10/1931 | Short ............................ 29/517 |
| 2,122,839 A | * | 7/1938 | Guy .............................. 29/508 |
| 3,318,413 A | * | 5/1967 | Werner et al. ................ 403/281 |
| 3,579,805 A | | 5/1971 | Kast |
| 4,602,411 A | * | 7/1986 | Brown ........................... 29/447 |
| 4,768,385 A | | 9/1988 | Cage |
| 5,150,636 A | | 9/1992 | Hill |
| 5,272,930 A | * | 12/1993 | Nakamura et al. ........... 29/888.1 |
| 5,344,717 A | | 9/1994 | Dutton, Jr. et al. |
| 5,347,701 A | * | 9/1994 | Hosseinian et al. ........... 29/508 |
| 5,392,511 A | * | 2/1995 | Copeland et al. ............ 29/888.1 |
| 5,576,500 A | | 11/1996 | Cage et al. |
| 5,713,246 A | * | 2/1998 | Thoolen ........................ 403/273 |
| 6,047,457 A | | 4/2000 | Bitto et al. |

FOREIGN PATENT DOCUMENTS

| | | |
|---|---|---|
| DE | 1948576 | 4/1970 |
| EP | 0 120 145 A1 | 10/1984 |
| EP | 0 702 213 A1 | 3/1996 |
| EP | 0 866 317 A1 | 9/1998 |
| GB | 1286826 | 8/1972 |
| GB | 2261837 A | 6/1993 |
| JP | 58144714 A | 8/1983 |
| JP | 59109818 A | 6/1984 |
| JP | 61269021 A | 11/1986 |
| WO | WO 92/14123 | 8/1992 |
| WO | WO 99/51946 | 10/1999 |

OTHER PUBLICATIONS

Parker, McGraw Hill Dictionary of Scientific And Technical Terms, 1994, p. 1818, Fifth Edition, McGraw Hill, Inc., New York.

* cited by examiner

*Primary Examiner*—David P. Bryant
(74) *Attorney, Agent, or Firm*—Cesari and McKenna, LLP

(57) ABSTRACT

A method for mounting a metal body on an essentially straight measuring tube, made of titanium or zirconium, of a Coriolis mass flowmeter. The method ensures secure retention of the metal body on the measuring tube even through very extended operation of the Coriolis mass flowmeter, in that the metal body is shrink-mounted on the measuring tube.

20 Claims, 4 Drawing Sheets

METHOD FOR MOUNTING A METAL BODY ON THE MEASURING TUBE OF A CORIOLIS MASS FLOWMETER

CROSS-REFERENCE TO RELATED APPLICATIONS

This application is a divisional of Ser. No. 09/632,661, filed Aug. 4, 2000, now U.S. Pat. No. 6,519,828.

BACKGROUND OF THE INVENTION

This invention relates to a method for mounting a metal body on an essentially straight measuring tube, made of titanium or zirconium, of a Coriolis mass flowmeter.

1. Field of the Invention

In terms of mass flowmeters operating by the Coriolis principle, one basically distinguishes between those whose Coriolis conduit is at least essentially straight and others whose Coriolis conduit is looped. An additional distinction is made between mass flowmeters equipped with only one Coriolis conduit and those with two Coriolis conduits where in the latter case, the two Coriolis conduits may be positioned in a tandem or parallel arrangement for an appropriate flow pattern.

More recently, mass flowmeters employing one essentially straight Coriolis conduit have increasingly gained in popularity. Mass flowmeters with one straight Coriolis conduit are simple in terms of their mechanical design, they can thus be fabricated at relatively low cost, the inner surface of the Coriolis conduits can be machined or finished without difficulty, there is only minimal pressure drop, and they are self-draining.

The measuring tubes, i.e. Coriolis conduits, of mass flowmeters are often made of titanium or zirconium.

2. Description of Prior Art

In the case of a straight measuring tube consisting of titanium or zirconium it is possible to mount on the measuring tube a metal body that may be part of an oscillator as required for the oscillatory excitation of the Coriolis conduit, or part of a process-variable detector measuring the oscillation of the Coriolis conduit, or a mounting collar for an oscillator or detector, for which purpose the metal body is provided with a bore that allows it to be slipped onto the measuring tube and to be moved to and attached at the intended location thereon. Traditionally, the metal body has been attached to the measuring tube at the mounting point for instance by being welded to the outer surface of the measuring tube. Another method has been to braze the metal body to the measuring tube.

In both cases, involving either the welding or the brazing process, the metal body is held on the measuring tube only at the particular point where it is welded or brazed to the measuring tube, meaning that most of the inner surface of the bore in the metal body does not contribute to the retaining strength. It follows that, when the Coriolis mass flowmeter is operated over an extended period, neither the contact area of the metal body nor its bonding strength offers optimal performance due to the vibratory-friction-induced wear of the welded or brazed junction.

A possible alternative for attaching a metal body to the measuring tube of a Coriolis mass flowmeter has been proposed for instance in EP OS 0 866 317. According to that method, a metal body, provided with a bore that matches the outer circumference of the measuring tube in the Coriolis mass flowmeter, is fitted and pressed onto the measuring tube, at ambient temperature, to a point where at least part of the circumferential surface of the metal body is subjected to enough pressure to hold it in place while at the same time there would be virtually no constriction of the internal diameter of the measuring tube. In practice, however, it has been found that during the operation of the Coriolis flowmeter, given the vibration of the measuring tube, a metal body mounted on the measuring tube of a Coriolis mass flowmeter in the manner just described is similarly subjected to vibratory friction-induced wear, as a result of which the metal body is loosened from the measuring tube, compromising its holding strength.

According to a method described in EP OS 0 702 213, it is also possible for a metal body slipped onto the measuring tube of a Coriolis mass flowmeter to be firmly connected to the measuring tube in that, with the aid of a rolling tool inserted in the measuring tube, the measuring tube is pressure-bonded with the inside wall of the bore in the metal body without any heat treatment. This, however, is a very costly process while still not ensuring secure retention of the metal body on the measuring tube after extended operation of the Coriolis mass flowmeter.

SUMMARY OF THE INVENTION

It is therefore the objective of this invention to provide a method for mounting a metal body on an essentially straight measuring tube, consisting of titanium or zirconium, of a Coriolis mass flowmeter, said method ensuring secure, solid retention of the metal body on the measuring tube even over a very long period of operation of the Coriolis mass flowmeter.

Solving the aforementioned problem is accomplished according to this invention in that the metal body is heat-shrunk onto the measuring tube. To that end, the metal body is provided with a bore having an inner diameter that is slightly smaller than the outer diameter of the measuring tube at the mounting location, and that it is mounted in fixed position on the measuring tube by heat-expanding the bore of the metal body enough to allow it to be pushed onto the measuring tube and moved to the intended point of attachment. As the metal body cools off, the cooling-related reduction of the inner diameter of the bore in the metal body produces a tight shrink-fit between the metal body and the measuring tube. Basically, shrink-fitting the metal body onto the measuring tube is also possible by chilling the measuring tube relative to the metal body, resulting in a reduced outer diameter of the measuring tube and allowing the metal body to be pushed onto the measuring tube and to the intended point of attachment on the same. As the measuring tube warms up again, its outer diameter expands, producing a tight shrink-fit between the metal body and the measuring tube.

A particularly durable, vibratory friction-wear-resistant bond between the metal body and the measuring tube is obtained, after the heat-shrinking of the metal body onto the measuring tube, by then welding the two units together. Welding the metal body to the measuring tube can be dispensed with, however, without compromising the integrity of the connection between the metal body and the measuring tube, by heat-shrinking the metal body onto a metal jacket firmly attached to the measuring tube. The solid connection between the metal jacket and the measuring tube can be established in different ways. For example, the metal jacket may be heat shrunk or pressed onto the measuring tube, but it is preferably welded to the measuring tube.

A particularly durable bond between the metal body and the measuring tube with the interpositioning of a metal jacket is obtained by keeping the length of the jacket to little more than the length of the bore in the metal body, while the outer diameter of the jacket is substantially larger than the outer diameter of the measuring tube. Due to its limited length, the jacket is not subjected to much bending pressure as the measuring tube oscillates. Moreover, the rigidity of the jacket increases with its outer diameter, so that a metal jacket with a relatively large outer diameter bends very little as the measuring tube vibrates, which, in turn, minimizes the stress on the welded seams.

The pressure bond between the metal body and the measuring tube or the metal jacket firmly attached to the measuring tube can be further strengthened by coating the inner surface of the bore in the metal body with a filler material. That filler material would preferably be a metal such as silver, but a synthetic material such as PTFE may also be considered.

This invention also solves the problem first above mentioned by means of an outside tapered collet whose inner diameter essentially matches the outside diameter of the measuring tube at the attachment point and which, by virtue of a force applied parallel to the axis of the measuring tube, is pushed onto the measuring tube and into an inside tapered collet provided in a bore of the metal body and matching the outer cone surface of the outer tapered collet where it is held in place, resulting in a force fit between the metal body and the measuring tube. This mode of attaching the metal body to the measuring tube, where the metal body is practically wedged onto the measuring tube, is very durable while also offering the particular advantage of allowing the wedge lock between the metal body and the measuring tube to be released which, in turn, permits very easy removal of the metal body from the measuring tube or a positional adjustment on the latter. This type of attachment greatly facilitates work in cases where the process-variable detector or the oscillator needs to be repaired.

The inside tapered collet may be in the form of a separate component, but it is preferably an integral part of the metal body.

A further reinforcement of the bond between the metal body and the measuring tube is obtained by solidly mounting the outside tapered collet on the measuring tube. To that effect, the outside tapered collet is heat-shrunk or force-fitted onto the measuring tube. Preferably, however, the outside tapered collet is slipped and then welded onto the measuring tube.

It is also possible to attach the outside tapered collet to the measuring tube without welding it on, without compromising the firm connection between the metal body and the measuring tube, by mounting the outside tapered collet on a metal jacket that is firmly attached to the measuring tube. The firm connection between the said jacket and the measuring tube is preferably made by welding. In this case, the size of the jacket is preferably limited to where its length is little more than the length of the bore in the metal body while the outer diameter of the jacket is significantly greater than the outer diameter of the measuring tube. When an outside tapered collet and an inside tapered collet are used for attaching the metal body to the measuring tube, a metal jacket thus configured offers the same advantages as those referred to above in reference to the shrink-mounting of the metal body on the measuring tube.

A particularly good way of transferring the force required for moving and holding the outside tapered collet and/or the inside tapered collet against the wide lateral surfaces of the outside tapered collet and/or inside tapered collet, respectively, within a broad temperature range making it nearly temperature-independent, is obtained by transferring that force by way of a ring butting against the lateral surface, respectively, of the outside tapered collet and the inside tapered collet. These rings are preferably made of copper.

The force for moving and holding the outside tapered collet and the inside tapered collet is generated in particularly simple fashion by configuring the outside and inside tapered collet combination within a screw coupling by means of which, when screwed together, the outside tapered collet and the inside tapered collet are forced into each other.

Like the measuring tube, the outside tapered collet and the inside tapered collet can consist of titanium or zirconium, but the outside tapered collet and/or the inside tapered collet may also be made from steel or stainless or alloy steel.

As in the case where the metal body is shrink-mounted on the measuring tube, it is possible here as well to further strengthen the pressure bond between the metal body and the measuring tube by coating the inner surface of the bore in the outside tapered collet with a filler material. The filler material may consist, for instance, of a metal such as silver but a synthetic material such as PTFE may also be considered.

According to this invention, the problem first above mentioned can also be solved by providing the metal body with a bore essentially matching the outer diameter of the measuring tube in the area of the mounting point, sliding the metal body onto the measuring tube, then forcing it either onto a metal jacket firmly attached to the measuring tube or directly onto the measuring tube itself, and then welding it to the latter.

As explained above, merely pressing the metal body onto the measuring tube of the Coriolis mass flowmeter does not provide a durable bond between the metal body and the measuring tube over the course of an extended operation of the Coriolis mass flowmeter, which is why, in the case at hand, the metal body is additionally welded or force-fitted onto a jacket firmly attached to the measuring tube, offering the same advantages as those described above relative to the shrink-mounting onto a jacket provided on the measuring tube or the wedging of an outside tapered collet with an inside tapered collet on a jacket of that type.

In the case where the the metal body is pressed on, the solid connection between the metal jacket and the measuring tube is again preferably established by welding together the jacket and the measuring tube.

Again, optimized retention of the metal body on the jacket and thus on the measuring tube is obtained especially when the length of the jacket only slightly exceeds the length of the bore in the metal body and the outer diameter of the jacket is significantly greater than the outer diameter of the measuring tube.

For an improved lodgement of the metal body on the measuring tube, the inner surface of the bore in the metal body is coated with a filler material. The filler material is preferably a metal such as silver or a synthetic material such as PTFE.

In all of the methods described above for attaching a metal body to the measuring tube, i.e. shrink-mounting the metal body, wedging the inside tapered collet into the outside tapered collet or force-fitting the metal body, the metal body consists preferably of titanium or zirconium as does the measuring tube, or of steel or stainless or alloy steel.

Also, in all cases described, the metal body may be a retaining collar for an oscillator or a process-variable detector, or part of an oscillator or process-variable detector.

BRIEF DESCRIPTION OF THE DRAWINGS

There are numerous individual possibilities to implement and further enhance the method according to this invention for mounting a metal body on an essentially straight measuring tube, consisting of titanium or zirconium, of a Coriolis mass flowmeter. In this context, reference is made to the dependent claims following the independent patent claims, and to the description of different embodiments of this invention in conjunction with the appropriate drawings, in which:

DETAILED DESCRIPTION OF AN ILLUSTRATIVE EMBODIMENT

Figure 1:
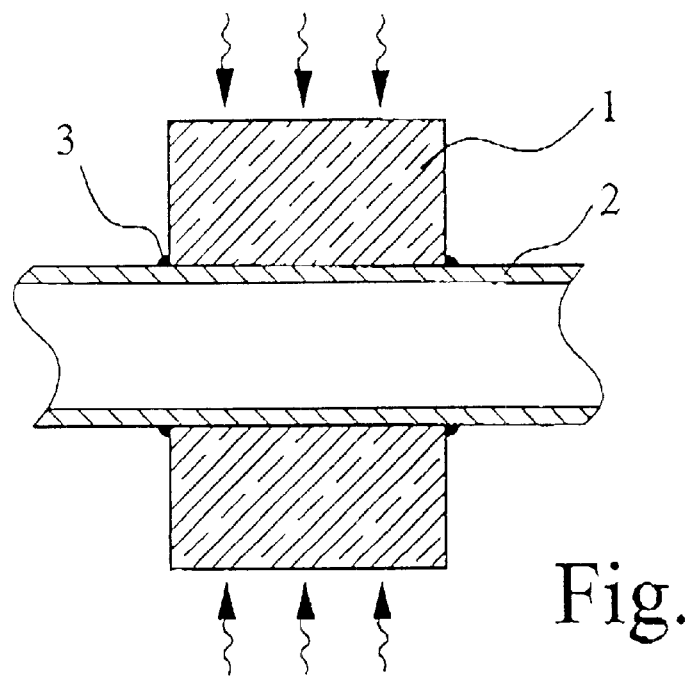
FIG. 1 is a schematic illustration of a method according to a first preferred embodiment of the invention, whereby the metal body is shrink-mounted on the measuring tube.

Schematically shown in FIG. 1 is a method according to a first preferred embodiment of this invention. As can be seen in the cross-sectional illustration, a metal body 1 is shrink-mounted on an essentially straight measuring tube 2, consisting of titanium or zirconium, of a Coriolis mass flowmeter. The two sets of three wavy arrows, each pointing radially at the axis of the measuring tube 2, indicate how, upon cooling, the inner diameter of the metal body 1 shrinks, causing the metal body 1 to be shrink- or pressure-fitted on the measuring tube 2. For durable retention of the metal body 1 on the measuring tube 2, the shrink-mounted metal body 1 is additionally welded to the measuring tube 2 at the welding points 3.

Figure 2:
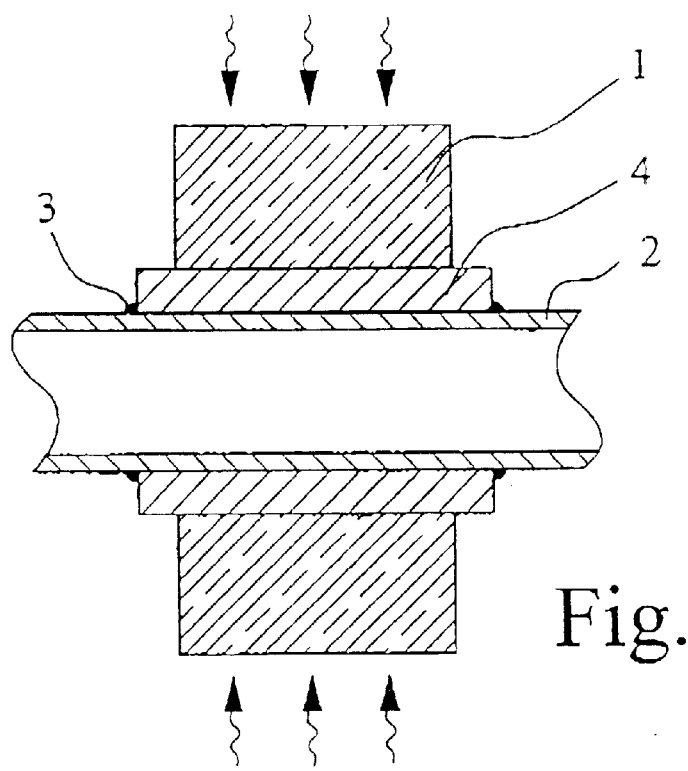
FIG. 2 is a schematic illustration of a method according to a second preferred embodiment of the invention, whereby the metal body is shrink-mounted on a metal jacket welded onto the measuring tube.

Schematically shown in FIG. 2 is a method according to a second preferred embodiment of this invention. As can be seen in the cross-sectional illustration, the metal body 1 is shrink-mounted not directly on the measuring tube 2 but on a metal jacket 4 that is firmly connected to the measuring tube 2. The metal jacket 4 is welded to the measuring tube 2 at welding points 3.

Figure 3:
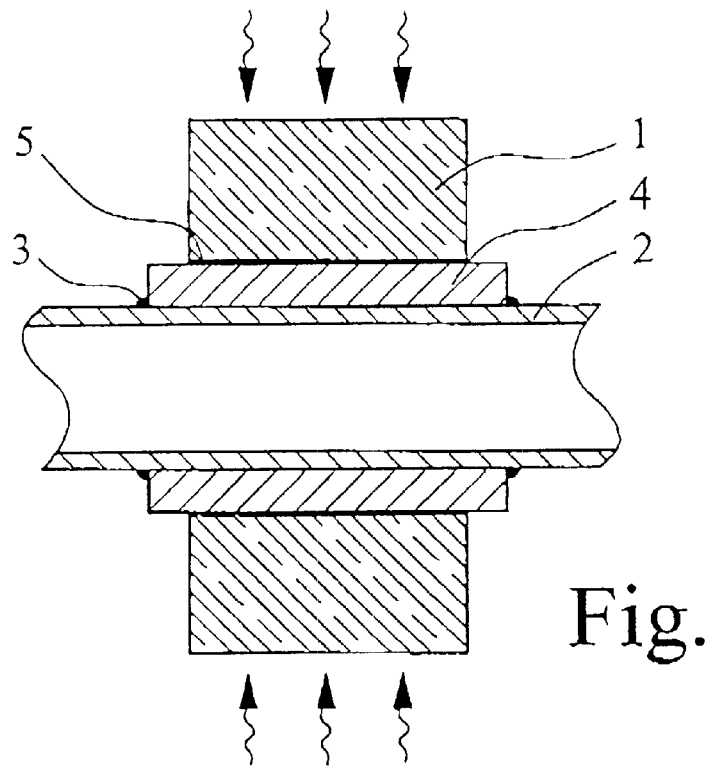
FIG. 3 is a schematic illustration of a method according to a third preferred embodiment of the invention, whereby the inside of the bore in the metal body is coated.

FIG. 3 depicts a method according to a third preferred embodiment of this invention. As can be seen in the cross-sectional illustration, the method according to FIG. 2 is further augmented by the application of a silver coating 5 on the inner surface of the bore in the metal body 1. The silver coating 5 serves as a filler material which further strengthens the position and hold of the metal body 1 on the metal jacket 4.

Figure 4:
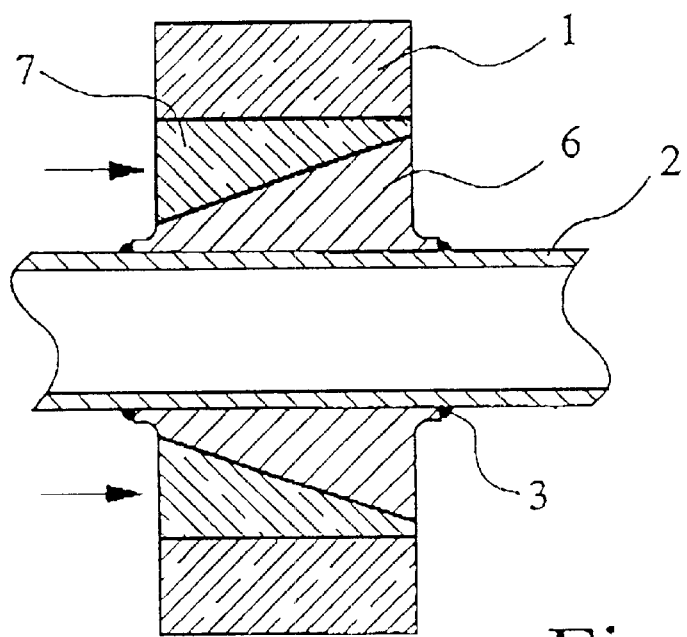
FIG. 4 is a schematic illustration of a method according to a fourth preferred embodiment of the invention, whereby the metal body is attached to the measuring tube with the aid of a combination of an outside tapered collet and an inside tapered collet.

Schematically shown in FIG. 4 is a method according to a fourth embodiment of this invention. As can be seen in the cross-sectional illustration, the metal body 1 is attached to the measuring tube 2 by inserting in the bore of the metal body 1 an outside tapered collet 6 and an inside tapered collet 7. The arrows show how the necessary force is applied to the broad side of the inside tapered collet 7. The outside tapered collet 6 and the inside tapered collet 7 are pushed together in the bore of the metal body 1 in a way as to be wedged solid, resulting in a pressure fit of the metal body 1 on the measuring tube 2. To ensure a durable lodgement of this combination, the outside tapered collet 6 is additionally welded to the measuring tube 2 at the welding points 3. The welding can be done after the outside tapered collet 6 and the inside tapered collet 7 have been wedged together. However, welding the outside tapered collet to the measuring tube 2 before the outside tapered collet 6 and the inside tapered collet 7 are wedged together will facilitate the precise alignment of the metal body 1 on the measuring tube 2.

Figure 5:
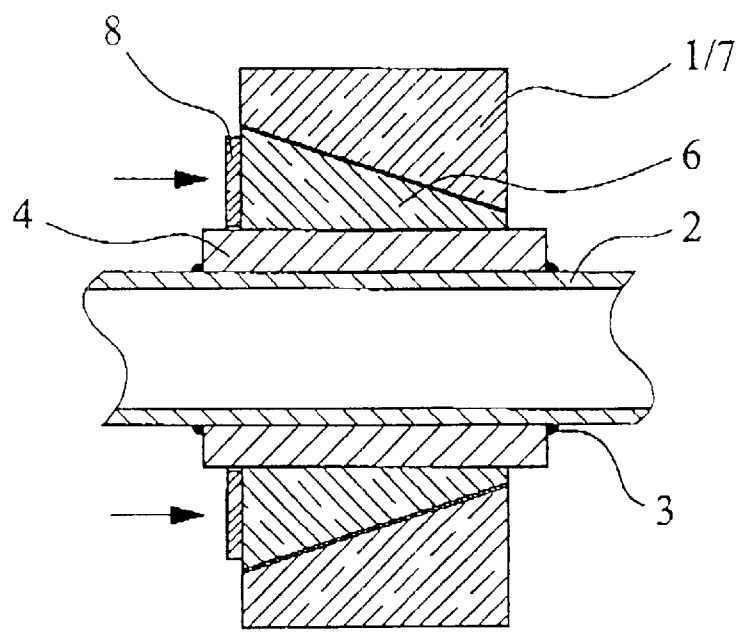
FIG. 5 is a schematic illustration of a method according to a fifth preferred embodiment of the invention, whereby the metal body is attached to a jacket, welded to the measuring tube, with the aid of a combination of an outside tapered collet and an inside tapered collet.

FIG. 5 depicts a method according to a fifth embodiment of this invention. As can be seen in the cross-sectional illustration, the inside tapered collet 1/7 is integrated in the metal body 1 and is pushed onto the outside tapered collet 6. The arrows again show how the necessary force is transferred to the broad side of the outside tapered collet 6 by way of a copper ring 8. Also, in the method illustrated in FIG. 5 the metal body 1 is attached, not directly to the measuring tube 2, but to a metal jacket 4 welded to it. This obviates the need for the outside tapered collet 6 to be welded on itself.

Figure 6:
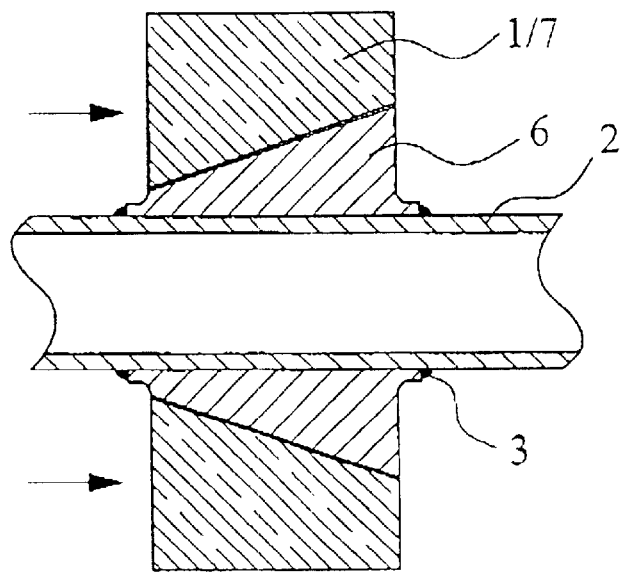
FIG. 6 is a schematic illustration of a method according to a sixth preferred embodiment of the invention, whereby the metal body is attached to the measuring tube with the aid of a combination of an outside tapered collet and an inside tapered collet wherein the outside tapered collet is welded to the measuring tube.

FIG. 6 depicts a method according to a sixth embodiment of this invention. As can be seen in the cross-sectional illustration, the outside tapered collet 6, unlike that in the method according to FIG. 5, is not attached to a metal jacket 4 welded to the measuring tube 2, but is instead attached directly to the measuring tube 2. To ensure the necessary positive retention of the metal body 1, the metal body 1 is welded to the measuring tube 2 at the welding points 3.

Figure 7:
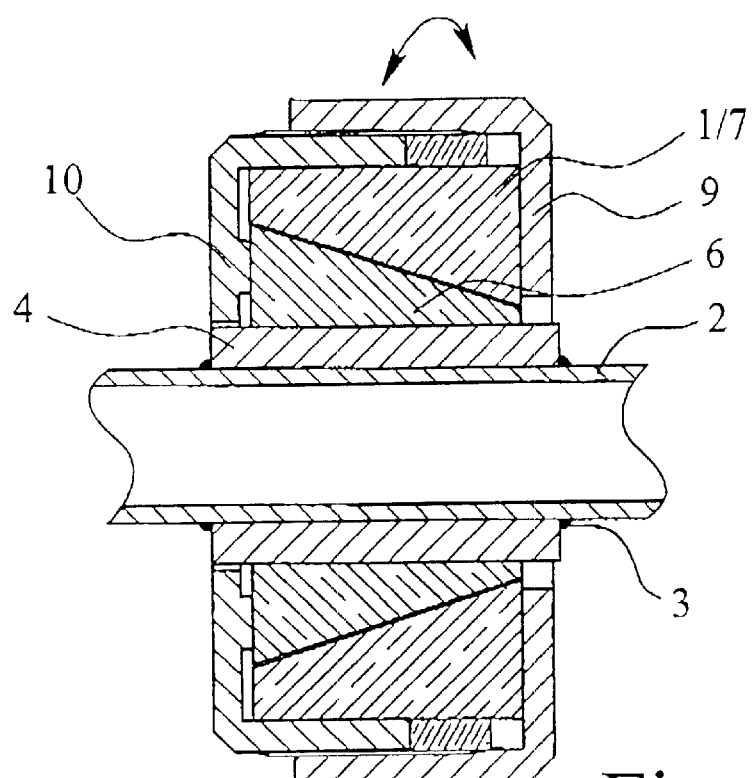
FIG. 7 is a schematic illustration of a method according to a seventh preferred embodiment of the invention, whereby, with the aid of a combination of an outside tapered collet and an inside tapered collet, the metal body is retained by means of a screw coupling.

FIG. 7 depicts a method according to a seventh preferred embodiment of this invention. As can be seen in the cross-sectional illustration, the outside tapered collet 6 and the inside tapered collet 1/7 that is an integral part of the metal body 1 are screwed together in an outer screw coupling 9 and an inner screw coupling 10. Both segments of the screw coupling engage in one another with the aid of male and female threads and can thus be screwed tightly together. When these are screwed together, a section protruding from the inner screw coupling 10 causes a force to be applied to the broad side of the outside tapered collet 6, while the broad side of the metal body featuring the inside tapered collet 1/7 meets with a counterstop in the form of the inside of the outer screw coupling 9. To avoid having to weld the screw coupling or the outside tapered collet 6 to the measuring tube 2, the combination of outside tapered collet 6 and inside tapered collet 1/7 is attached within the screw coupling to a metal jacket 4 that is welded onto the measuring tube 2.

Figure 8:
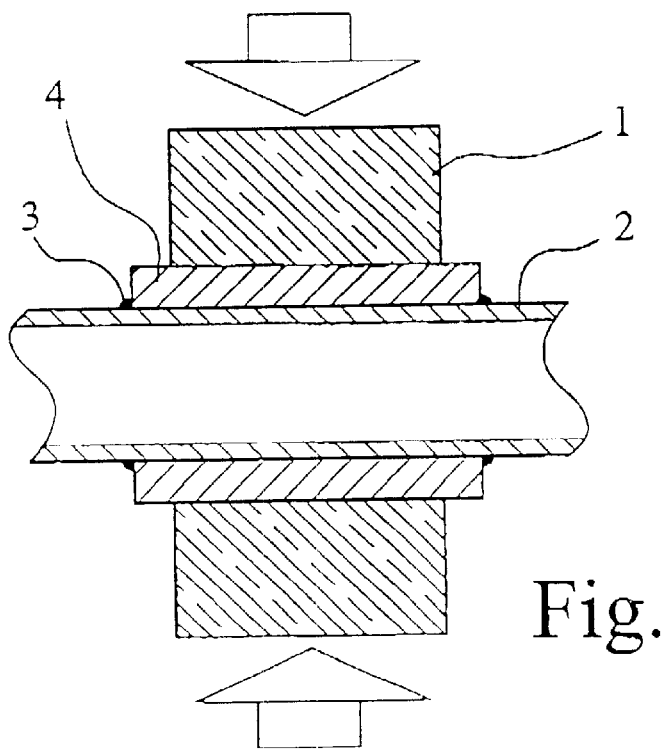
FIG. 8 is a schematic illustration of a method according to an eighth preferred embodiment of the invention, whereby the metal body is force-fitted onto the measuring tube.

FIG. 8 depicts a method according to an eighth preferred embodiment of this invention. As can be seen in the cross-sectional illustration, the metal body 1 is pressure-fitted on a metal jacket 4 that is welded to the measuring tube 2. The large arrows radially pointing at the axis of the measuring tube 2 indicate the pressure exerted on the circumferential area of the metal body 1 for the pressure-mounting. This pressure is applied to the metal body 1 in such fashion that it does not act on the entire circumferential surface of the metal body 1 but always leaves between the pressure-exposed sections, other sections not subjected to pressure, thus allowing the material of the metal body 1 to partly yield in an outward direction which significantly facilitates the pressure-mounting process.

We claim:

1. A method for mounting a metal body on an essentially straight measuring tube, consisting of titanium or zirconium, of a Coriolis mass flow meter, comprising steps of providing a measuring tube;

providing a metal jacket having an outer diameter;

firmly attaching the metal jacket to the measuring tube;

providing a metal body with a bore having an inner diameter that is slightly smaller than the outer diameter of the metal jacket;

heat-expanding the bore of the metal body enough to allow it to be pushed onto the metal jacket; and allowing the metal body to cool off, the cooling-related reduction of the inner diameter of the bore in the metal body producing a tight shrink-fit between the metal body and the metal jacket.

2. The method as in claim 1, including the step of firmly attaching the metal jacket to the measuring tube by welding the metal jacket to the measuring tube.

3. The method as in claim 1 or 2, including selecting the length of the metal jacket to be only slightly greater then the length of the bore in the metal body and the outer diameter of the jacket to be significantly larger than the outer diameter of the measuring tube.

4. The method as in claim 1 or 2, including the step of coating the inner surface of the bore in the metal body with a filler material.

5. The method as in claim 4, including the step of selecting as the filler material a metal such as silver or a synthetic material such as PTFE.

6. A method for mounting a metal body having a bore on an essentially straight titanium or zirconium Coriolis mass flow meter measuring tube having an axis and a mounting area with a selected outer diameter, said method comprising the steps of:

providing an inside tapered collet in said bore;

forming an outside tapered collet having an inner diameter essentially matching the outer diameter of the mounting area;

engaging the outside tapered collet on the measuring tube at said mounting area, and pushing the outside and inside tapered collets together with a pushing force in the direction of said axis so that said tapered collets interfit, the tapers of said collets being dimensionally matched so that said pushing force provides sufficient radial pressure to create a force fit of the metal body on the measuring tube.

7. The method as in claim 6, including the step of forming the inside tapered collet as an integral part of the metal body.

8. The method as in claim 6 or 7, including the step of welding the outside tapered collet to the measuring tube.

9. The method as in claims 6 or 7 including the steps of:

mounting the outside tapered collet on a metal jacket, and firmly attaching the metal jacket to the measuring tube.

10. The method as in claim 9, including selecting the length of the metal jacket to be only slightly greater than the length of the bore in the metal body and the outer diameter of the metal jacket to be significantly larger than the outer diameter of the measuring tube.

11. The method as in claim 6 or 7, including the steps of:

flush-mounting a ring, preferably consisting of copper, on the inside surface of the outside tapered collet and/or on the outside of the inside tapered collet, and applying the pushing force by way of said ring.

12. The method as in claim 6 or 7, wherein said pushing step is accomplished with the aid of a screw coupling.

13. The method as in claim 6 or 7, including the step of forming the outside tapered collet and/or the inside tapered collet of titanium, steel or stainless or alloy steel.

14. The method as in claim 6 or 7, including the step of coating the inner surface of the outside tapered collet with a filler material preferably consisting of a metal such as silver or a synthetic material such as PTFE.

15. A method for mounting a metal body on an essentially straight titanium or zirconium measuring tube of a Coriolis mass flow meter, said method comprising the steps of:

firmly engaging a metal jacket around the measuring tube;

pushing a tubular metal body having an inner surface onto the metal jacket;

pressing the metal body inward directly against the metal jacket, and welding the metal body to the metal jacket.

16. The method as in claim 15, including the step of welding the metal jacket to the measuring tube.

17. The method as in claim 16, including selecting the length of the metal jacket to be only slightly greater than the length of the inner surface of the metal body and the outer diameter of the metal jacket to be significantly larger then the outer diameter of the measuring tube.

18. The method as in one of the claims 15 to 17, including the step of coating the inner surface of the metal body with a filler material preferably consisting of a metal such as silver or a synthetic material such as PTFE.

19. The method as in one of the claim 1, 6 or 15, including the step of forming the metal body of titanium, zirconium, steel or stainless or alloy steel.

20. The method as in one of the claim 1, 6 or 15, including the step of forming the metal body as a retaining collar for an oscillator or a process-variable detector or a part of an oscillator or process-variable detector.

* * * * *